(12) United States Patent
Larente

(10) Patent No.: US 6,371,177 B1
(45) Date of Patent: Apr. 16, 2002

(54) TREE DELIMBING HEAD FOR BOOM-TYPE DELIMBERS

(76) Inventor: Alain Larente, 153-7th Street, P.O. Box 487, Ferme-Neuve, Quebec (CA), J0W 0C0

( * ) Notice: Subject to any disclaimer, the term of this patent is extended or adjusted under 35 U.S.C. 154(b) by 0 days.

(21) Appl. No.: 09/616,904

(22) Filed: Jul. 14, 2000

(51) Int. Cl.$^7$ .............................................. A01G 23/095
(52) U.S. Cl. .................................. 144/24.13; 144/4.1
(58) Field of Search .............................. 144/335, 336, 144/338, 339, 343, 4.1, 34.1, 24.13

(56) References Cited

U.S. PATENT DOCUMENTS

| | | | |
|---|---|---|---|
| 3,882,910 A | | 5/1975 | Peltola et al. |
| 4,109,689 A | | 8/1978 | Castine |
| 4,276,918 A | * | 7/1981 | Sigouin .................... 144/24.13 |
| 4,382,457 A | | 5/1983 | Hahn |
| 4,913,203 A | * | 4/1990 | Lessard .................... 144/24.13 |
| 5,082,036 A | * | 1/1992 | Vierikko ...................... 144/336 |
| 5,355,920 A | * | 10/1994 | Tanguay .................. 144/24.13 |
| 5,533,555 A | | 7/1996 | Hudson |
| 5,568,829 A | | 10/1996 | Crawford et al. |
| 5,709,254 A | * | 1/1998 | Argue ........................ 144/336 |
| 5,865,229 A | * | 2/1999 | Unosen ...................... 144/336 |
| 5,979,518 A | * | 11/1999 | Hamby ...................... 144/336 |

FOREIGN PATENT DOCUMENTS

| | | |
|---|---|---|
| CA | 779081 | 2/1968 |
| CA | 835143 | 2/1970 |
| CA | 872597 | 6/1971 |
| CA | 920482 | 2/1973 |
| CA | 1055366 | 5/1979 |
| CA | 1090681 | 12/1980 |

OTHER PUBLICATIONS

Denharco Inc., Saint–Hyacinthe, Quebec, Canada: Telescopic Boom Delimber DT–3000; Operation, Parts, and Maintenance Apr., 1997, pp. 1002–1011.

* cited by examiner

Primary Examiner—Ed Tolan
(74) Attorney, Agent, or Firm—Robert A. Wilkes

(57) ABSTRACT

A head for a tree delimbing machine having a boom. The head combines a topping knife assembly with a butting saw assembly and a gripping arms assembly in a single unit. The improved head simplifies not only the delimbing operation but also the topping and butting operations as well. The head combines all three operations into one device and can be retrofitted on to existing boom-type delimbing machines.

16 Claims, 2 Drawing Sheets

TREE DELIMBING HEAD FOR BOOM-TYPE DELIMBERS

FIELD OF THE INVENTION

The invention relates to tree delimbing devices, specifically to attachments to the delimbing machines equipped with booms.

DISCUSSION OF THE PRIOR ART

The felling and harvesting of timber is not an easy task, especially for larger trees. The timber industry is continually in search of better and faster methods to harvest and process felled trees. One necessary task in the harvesting of trees is the removal of rotten or useless pieces of the tree. This removal of useless pieces of the tree along with the discarding of parts of the trunk that have either become rotten or that are too small in diameter to be of use includes removing parts of the trunk that have a break or a snag. The above task is necessary given the conditions surrounding the growth and harvesting of trees. For the timber industry, the most useful, and therefore most important part, of the tree is the healthy trunk with a mostly uniform diameter. Thus, other parts of the tree, such as its branches, are not as important and can be discarded. Another part of the tree that can be discarded is its top. Given that trees grow out from the top most part of its crown, the top end of the trunk, the most recent growth of the tree, does not have a diameter similar to the rest of the trunk. As such, this top end of the trunk must be discarded to yield the useful parts of the trunk. Furthermore, since trees that are felled are not immediately processed and sent to a timber plant, felled trees can lie on the ground for significant periods of time. Unfortunately, this can result in rot setting at the bottom of the trunk. Such rotten ends of the trunk are also useless and must be discarded.

Another problem with rot arises when the felled tree has a break in the trunk. Such a break, because of being left on the ground for significant periods of time, can cause rot in both parts of the broken trunk. The two ends of the trunk would therefore have to be cleaned up by removing their rotten ends. This operation involves cutting the trunk close to the position of the break on the trunk. Often, this position is somewhere within the middle portion of the trunk where the tree can be at its thickest.

From the above, it can be seen that the processing of a tree trunk to remove the useless portions can have three distinct steps:
1) removal of the tree top or broken end (topping)
2) removal of the rotten end of the trunk (butting)
3) removal of the branches or limbs (delimbing)

This processing is ideally done at the tree harvesting site and before the tree trunk is sent to the timber plant. Numerous machines have therefore been invented to try and make the above process easier.

A patent issued to Jorgensen, Canadian patent 779,081, discloses a machine for the trimming of felled trees. The machine has a telescoping boom and a gripping tool at the end of the boom. The machine removes the limbs of a felled tree by moving the gripping tool down the trunk of the felled tree. The gripping tool is equipped with a trimming tool that can remove the less useful tree tops from the trunk. Also disclosed in the patent is a second device attached farther down the boom. This second device is a cutting tool of the saw or shears type capable of cutting the tree into specific lengths and removing rotten portions of the trunk.

Unfortunately, the above device suffers from a number of draw backs. Specifically, it suffers from having to move the felled tree up the boom to remove both rotten portions of the trunk and the tree top. To remove the tree top and rotten portion of the trunk while preserving the trunk's length, the machine (1) picks up the tree for the first time from the tree top end, (2) removes the top, (3) removes the limbs, (4) drops the tree, (5) picks up the tree for a second time from its bottom end, then (6) removes the rotten end. This necessitates numerous steps that the machine operator has to follow along the with the attendant consumption of fuel and time. Also, the patent notes that if the trunk is gripped from its bottom end, the total working range of the machine is reduced.

Another device using a sliding boom mechanism is disclosed in U.S. Pat. No. 5,568,829 issued to Crawford et al. Crawford et al discloses a delimber machine with a grappling head having grappling arms and a topping saw. Unfortunately, this topping saw is only capable of removing the tops of trees. There is no means disclosed for removing rotten ends of large trunks.

It is clear from the above that an improved delimbing head is needed that does not suffer from the above drawbacks. What is required is a delimbing head that simplifies not only the delimbing operation but also the topping and butting operations as well. Such a head would combine all three operations into one device and can preferably be retrofitted onto existing boom-type delimbing machines.

SUMMARY OF THE INVENTION

The present invention overcomes the deficiencies identified in the prior art by providing a tree delimbing head which combines a topping knife assembly with a butting saw assembly in a single unit.

The present invention provides for a delimbing head for a tree delimbing apparatus having a boom, the head comprising a body, boom attachment means to attach the body to the boom, a chainsaw assembly attached to the body, a topping knife assembly attached to the body, and a gripping arms assembly attached to the body wherein
1) the gripping arms assembly grips a felled tree trunk such that a longitudinal axis of the trunk is substantially parallel to the boom and
2) the chainsaw assembly, the knife assembly, and the gripping arms assembly are disposed in a single line on the body of the head.

Preferably, the chainsaw assembly comprises a chainsaw pivotally attached to the body by a pivot attachment means, means to operate the chainsaw, and means to controllably swivel the chainsaw about the pivot attachment means, wherein a controllable swivel of the chainsaw defines a cutting plane and said cutting plane is substantially perpendicular to the boom.

More preferably, the gripping arms assembly includes at least one pair of cooperating arcuate gripping arms and means to operate the or each pair of gripping arms between an open position and a closed position.

Most preferably, the knife assembly includes a pair of cooperating blades defining a cutting jaw and means to operate the cutting jaw between an open jaw position and a closed jaw position wherein in the closed jaw position a plane defined by the cooperating blades is substantially perpendicular to the boom.

Conveniently, each gripping arm has a lip on an inner circumference, said lip having at least one cutting edge defining an arcuate plane, said arcuate plane being substantially parallel to the longitudinal axis of the trunk.

More conveniently, the gripping arms assembly is between the chainsaw assembly and the knife assembly.

Most conveniently, the chainsaw assembly further includes a saw assembly delimbing blade attached to a bottom part of the chainsaw assembly wherein a plane defined by a cutting edge of the saw assembly delimbing blade is substantially parallel to the boom.

Also preferably, the knife assembly further includes a knife assembly delimbing blade attached to a bottom part of the knife assembly wherein a plane defined by a cutting edge of the knife assembly delimbing blade is substantially parallel to the boom.

In another embodiment of the invention, there is provided a delimbing head for a tree delimbing machine having a boom, the head including means to slidably attach the head to the boom, means to control the position of the head on the boom, chainsaw cutting means pivotally attached to the head, trunk gripping means for gripping a tree trunk, said trunk gripping means being attached to said head, topping knife means attached to said head, and a plurality of delimbing blades attached to said head, each delimbing blade having a cutting edge defining a plane parallel to a longitudinal axis of the trunk.

Yet another embodiment of the invention provides for a delimbing head for a tree delimbing machine having a telescopic boom, the head including means to attach the head to the boom, a chainsaw pivotally attached to the head, a pair of arcuate pincers for gripping a tree trunk about a circumference of the trunk, the pincers having an open and a closed position and at least a pair of cutting edges parallel to a longitudinal axis of the trunk, a pair of cutting jaws for cutting tree tops, and delimbing blades attached to said head, each delimbing blade having a cutting edge defining a plane parallel to a longitudinal axis of the trunk wherein the chainsaw, the cutting jaws, and the arcuate pincers are adjacent to one another.

The advantages of the invention are numerous. The need for a butting saw close to the cab of a delimbing machine is removed, thus making the machine cheaper. By combining the butting saw with the topping knives, less movement of the boom is required. Also, any length of trunk can be cut off from the main tree trunk using the butting saw. Furthermore, the head can be retrofitted to existing delimbing machines, obviating the need to buy a completely new machine to take advantage of the benefits of the new head.

BRIEF DESCRIPTION OF THE DRAWINGS

A better understanding of the invention may be obtained by reading the detailed description of the invention below, in conjunction with th e following drawings, in which.

DETAILED DESCRIPTION OF THE PREFERRED EMBODIMENT

Figure 1:
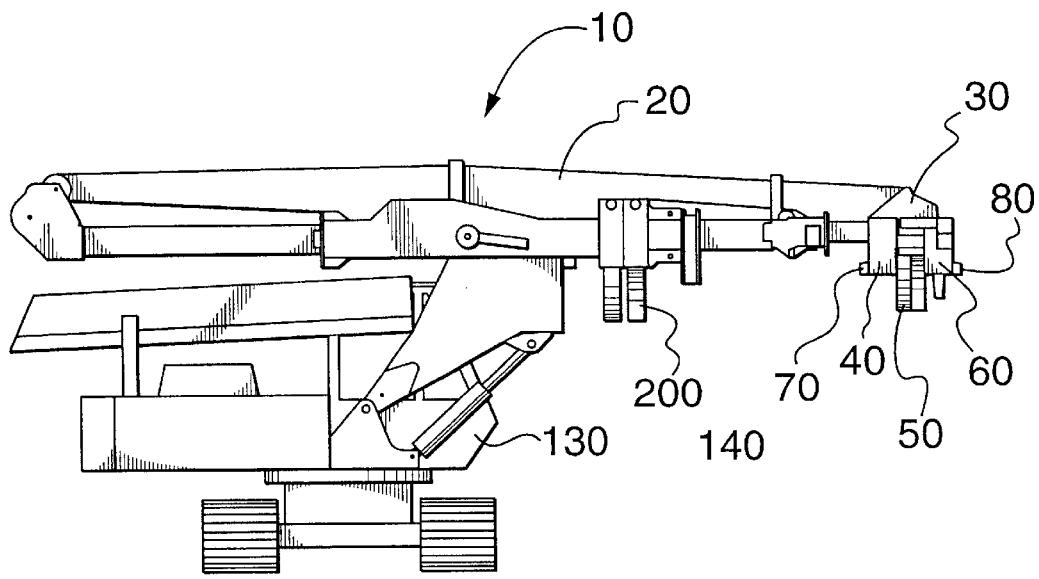
FIG. 1 is a diagram of a tree delimbing machine.

Referring to FIG. 1, a boom-type tree delimbing machine 10 is shown. The machine 10 has a boom 20 which can be telescopically or slidably extended. At the end of the boom 20 is the delimbing head 30.

Figure 2:
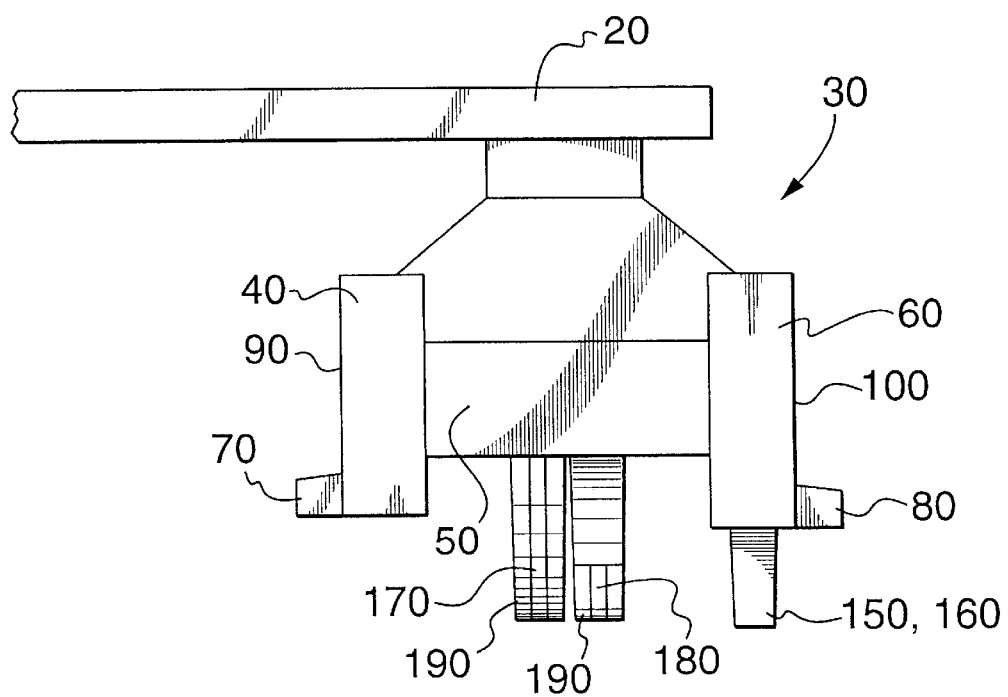
FIG. 2 is a side view of a tree delimbing head in accordance with the invention.

Referring to FIG. 2, the details of the head 30 are disclosed. The side view of the head 30 shows its three main components: the chainsaw assembly 40, the grappling arms assembly 50, and the topping knives assembly 60. As can be seen, the boom 20 is above the three assemblies 40, 50, and 60. FIG. 2 also shows the end delimbing blades 70 and 80. The delimbing blade 70 is attached to th e door 90 of the chainsaw assembly 40 while the delimbing blade 80 is attached to the face plate 100 of the knife assembly 60.

Figure 3:
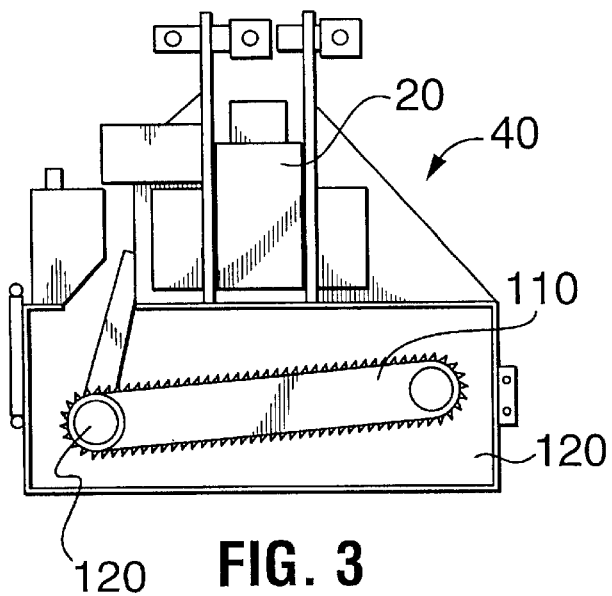
FIG. 3 is a front view of a chainsaw assembly according to the invention.

FIG. 3 shows the inside of the chainsaw assembly 40. The chainsaw 110 is attached to the assembly by means of a pivot 120. The pivot 120 can swivel the chainsaw 110 by either hydraulic or electrical means. At its rest position, the chainsaw 110 is housed within the chainsaw assembly housing 120. The chainsaw 110 is well known and its operations will not be discussed here. However, it must be noted that the chainsaw 110 is activated and operated from within the cab 130 of the delimbing machine 10. The pivot 120, which controls the swivelling action of the chainsaw 110 is also operated-from within the cab 130 by a combination of hydraulic and electrical means. Upon activation, the chainsaw 110 is turned on and, when desired, the pivot 120 swivels the chainsaw 110 downwards. This has the effect of cutting the tree trunk that is held parallel to the boom 20. After cutting the trunk, the chainsaw 110 is then retracted into its housing 120. The chainsaw 110 is therefore only activated and operated when desired.

It should be noted that in previous designs, as in the Telescopic Boom Delimber DT-3000 produced and sold by Denharco Inc., a chainsaw attached to the head,, without a corresponding knife assembly as disclosed here, is always active. In the Denharco design, because the chainsaw is the only cutting tool on the delimber head, the chainsaw is always running. This therefore leads to a waste of expensive chainsaw fuel and increased wear on expensive chainsaw parts.

Figure 4:
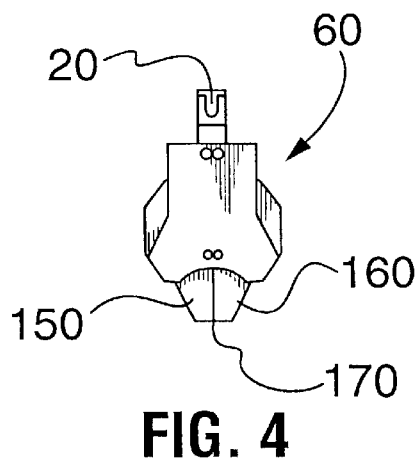
FIG. 4 is a front view of a knife assembly as used in the invention.

FIG. 4 details the topping knife assembly 60. As can be seen, the knife assembly 60 has a pair of cooperating blades 150, 160. These blades 150, 160, in the closed position (as shown in FIG. 4) meet at a point 170. In the open position the tree trunk would be between the blades 150, 160. When desired, the blades 150, 160, operated by a suitable combination of electrical and hydraulic means (not shown), close and cut off the undesirable top part of the trunk. The topping function of the head is thus accomplished. Again, it must be noted that the operation of the knife assembly 60 is accomplished from within the cab 130. Well known control mechanisms are to be used in controlling the knife assembly 60.

Figure 5:
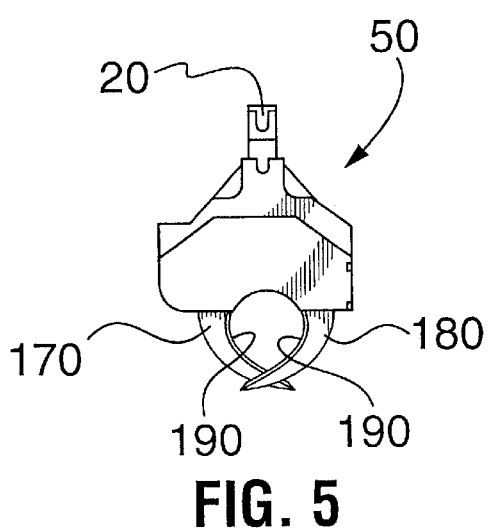
FIG. 5 is a front view of a gripping arms assembly as used in the invention illustrating an open position.
Figure 6:
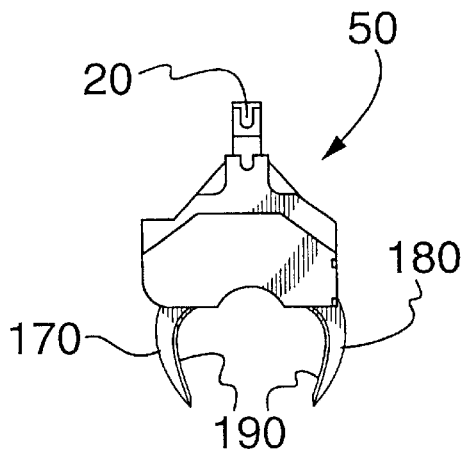
FIG. 6 is a front view of a gripping arms assembly as used in the invention illustrating a closed position.

FIG. 5 shows the workings of the gripping arms assembly 50. The arms assembly 50 comprises a pair of arms 170, 180 and suitable mechanisms to operate the arms 170, 180 between an open position (shown in FIG. 5) and a closed position (shown in FIG. 6). In the closed position, the arms 170, 180 grip the tree trunk while in the open positions the arms 170, 180 release the trunk. From FIGS. 5 and 6, we can see a lip 190. Each arm 170, 180 has a lip 190 which protrudes and has a cutting edge on at least one side. The relevance of the lip 190 will be explained below. It should be noted that the control of the arm assembly 50 is accomplished from within the cab 130. Again, suitable and well known control mechanisms are used.

An example of the delimbing, topping, and butting of a trunk best illustrates the workings of the head 30. To begin, the arms 170, 180 are locked in the open position. The boom 20 is then tilted to enable the arms 170, 180 to grip a felled tree close to either its top end or its bottom end. If gripping close to the bottom end, the head 30 activates its chainsaw 110 to remove the rotten bottom part of the trunk. The boom 20 then retracts and holds the trunk by a second gripping arms assembly 200. This secures the trunk 140 so that the delimbing operation can proceed.

The delimbing proceeds by extending the boom 20, while holding the trunk captive by the second arms assembly 200. This has the effect of running the head 30 along the length of the trunk 140. By holding the arms 170, 180 in the closed position, the lip 190 on each arm 170, 180 removes the branches that are in its path. Also, the delimbing blade 70 accomplishes the same object with respect to the branches not reachable by the arms 170, 180.

To further remove branches left behind, the boom 20 can be retracted, while again holding the trunk stationary. Delimbing blade 80 and the opposite side of lips 190 on arms 170, 180 then further remove any stumps or branches left behind by the initial pass of the head 30.

For the topping operation, the head 30 is moved to the top end of the trunk. The cooperating blades 150, 160 heretofore in the open position, are then engaged, cutting off the tree top. The blades 150, 160 thus removes the undesirable tree top.

If, on the other hand, the trunk is gripped close to its top end, the procedure outlined above is reversed. First, the topping operation is performed by clipping the tree top using the cooperating blades 150, 160. This may cause the arms 170, 180 to lose its grip of the trunk as it now grips the clipped tree top. Machine 10 can then re-grip the clipped trunk and proceed normally with the delimbing and butting operation.

Should the tree have a break in the middle of the trunk, the procedure to be followed is similar to that for the topping operation. The head 30 is moved to a position close to the break on the trunk. Then, should the use of the cooperating blades 150, 160 be inappropriate, perhaps because the trunk at this point be too thick to be sheared by the blades 150, 160, the chainsaw 110 is used. The chainsaw 110 is activated and used to cut the trunk at a point close to the break. Now that the trunk is in two sections, the machine 10 then picks up the second section of the trunk and removes its rotten portion. The normal delimbing and butting process as outlined above can then proceed on the separate sections of the trunk.

It must be noted that the arms 170, 180 can have a single common pivot or be separately pivoted. This pivoting option also applies to the cooperating blades 150, 160.

Furthermore, while the diagrams in this document show the arms assembly 50 as being between the chainsaw and the knife assemblies, this is not the only possibility. It is preferred that the arms assembly 50 be between the chainsaw and knife assemblies with the chainsaw assembly 40 nearest to the cab 130. However, any one of the assemblies can be between the other two. These alternatives would necessitate a relocation of the delimbing blades 70,80 to the outside assemblies.

The embodiments of the invention in which an exclusive property or privilege is claimed are defined as follows:

1. A delimbing head for a tree delimbing apparatus having a boom, the head comprising:

a body boom attachment means to attach the body to the boom a chainsaw assembly attached to the body a topping knife assembly attached to the body and a gripping arms assembly attached to the body wherein the gripping arms assembly grips a felled tree trunk such that a longitudinal axis of the trunk is substantially parallel to the boom and the chainsaw assembly, the knife assembly, and the gripping arms assembly are disposed in a single line on the body of the head.

2. A head as in claim 1 wherein the chainsaw assembly includes:

a chainsaw pivotally attached to the body by a pivot attachment means means to operate the chainsaw means to controllably swivel the chainsaw about the pivot attachment means wherein a controllable swivel of the chainsaw defines a cutting plane and said cutting plane is substantially perpendicular to the boom.

3. A head as in claim 1 wherein the gripping arms assembly includes:

at least one pair of cooperating arcuate gripping arms means to operate the or each pair of gripping arms between an open position and a closed position.

4. A head as in claim 1 wherein the knife assembly includes:

a pair of cooperating blades defining a cutting jaw means to operate the cutting jaw between an open jaw position and a closed jaw position wherein in the closed jaw position a plane defined by the cooperating blades is substantially perpendicular to the boom.

5. A head as in claim 2 wherein each gripping arm has a lip on an inner circumference, said lip having at least one cutting edge defining an arcuate plane, said arcuate plane being substantially parallel to the longitudinal axis of the trunk.

6. A head as in claim 1 wherein the gripping arms assembly is between the chainsaw assembly and the knife assembly.

7. A head as in claim 6 wherein the chainsaw assembly further includes a saw assembly delimbing blade attached to a bottom part of the chainsaw assembly wherein a plane defined by a cutting edge of the saw assembly delimbing blade is substantially parallel to the boom.

8. A head as in claim 6 wherein the knife assembly further includes a knife assembly delimbing blade attached to a bottom part of the knife assembly wherein a plane defined by a cutting edge of the knife assembly delimbing blade is substantially parallel to boom.

9. A head as in claim 1 wherein the chainsaw assembly is between the gripping arms assembly and the knife assembly.

10. A head as in claim 9 wherein the gripping arms assembly further includes an arms assembly delimbing blade attached to a bottom part of the gripping arms assembly wherein a plane defined by a cutting edge of the arms assembly delimbing blade is substantially parallel to the boom.

11. A head as in claim 9 wherein the knife assembly further includes a knife assembly delimbing blade attached to a bottom part of the knife assembly wherein a plane defined by a cutting edge of the knife assembly delimbing blade is substantially parallel to the boom.

12. A head as in claim 1 wherein the knife assembly is between the gripping arm s assembly and the chainsaw assembly.

13. A head as in claim 12 wherein the gripping arms assembly further includes an arms assembly delimbing blade attached to a bottom part of the gripping arms assembly wherein a plane defined by a cutting edge of the arms assembly delimbing blade is substantially parallel to the boom.

14. A head as in claim 12 wherein the chainsaw assembly further includes a saw assembly delimbing blade attached to a bottom part of the chainsaw assembly wherein a plane defined by a cutting edge of the saw assembly delimbing blade is substantially parallel to the boom.

15. A delimbing head for a tree delimbing machine having a boom, the head including:
   means to slidably attach the head to the boom
   means to control the position of the head on the boom
   chainsaw cutting means pivotally attached to the head
   trunk gripping means for gripping a tree trunk, said trunk gripping means being attached to said head
   topping knife means attached to said head
   a plurality of delimbing blades attached to said head, each delimbing blade having a cutting edge defining a plane parallel to a longitudinal axis of the trunk.

16. A delimbing head for a tree delimbing machine having a telescopic boom, the head including:
   means to attach the head to the boom
   a chainsaw pivotally attached to the head
   a pair of arcuate pincers for gripping a tree trunk about a circumference of the trunk, the pincers having an open and a closed position and at least a pair of cutting edges parallel to a longitudinal axis of the trunk
   a pair of cutting jaws for cutting tree tops
   delimbing blades attached to said head, each delimbing blade having a cutting edge defining a plane parallel to a longitudinal axis of the trunk,
wherein the chainsaw, the cutting jaws, and the arcuate pincers are adjacent to one another.

* * * * *